United States Patent
Barreyro et al.

(10) Patent No.: US 7,256,840 B2
(45) Date of Patent: Aug. 14, 2007

(54) DIGITAL TELEVISION SIGNAL TRANSLATOR

(75) Inventors: Ernesto C. Barreyro, Bartlett, IL (US); Timothy V. Frahm, Palatine, IL (US); Michael G. White, Deerfield, IL (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/049,776

(22) Filed: Feb. 3, 2005

(65) Prior Publication Data

US 2005/0132413 A1  Jun. 16, 2005

Related U.S. Application Data

(63) Continuation of application No. 09/827,447, filed on Apr. 6, 2001, now Pat. No. 6,919,930.

(51) Int. Cl.
H04N 5/38 (2006.01)
H04N 5/40 (2006.01)

(52) U.S. Cl. .................. 348/723; 348/724; 348/725; 348/731

(58) Field of Classification Search ............... 348/723, 348/724, 275, 726, 731, 180, 192, 21; 725/32–36; H04N 5/38, 5/40
See application file for complete search history.

(56) References Cited

U.S. PATENT DOCUMENTS

| | | |
|---|---|---|
| 5,208,666 A | 5/1993 | Elkind et al. |
| 5,841,433 A | 11/1998 | Chaney |
| 6,115,080 A | 9/2000 | Reitmeier |
| 6,185,228 B1 | 2/2001 | Takashimizu et al. |
| 6,209,131 B1 | 3/2001 | Kim et al. |
| 6,414,720 B1 * | 7/2002 | Tsukidate et al. ........... 348/469 |
| 6,473,129 B1 | 10/2002 | Choi |
| 6,559,898 B1 | 5/2003 | Citta et al. |
| 6,598,229 B2 | 7/2003 | Smyth et al. |
| 6,621,528 B1 | 9/2003 | Kessler et al. |
| 6,785,903 B1 * | 8/2004 | Kuh ........................... 725/50 |
| 6,919,930 B2 * | 7/2005 | Barreyro et al. ............ 348/723 |
| 2002/0047902 A1 | 4/2002 | Thomas et al. |
| 2004/0181799 A1 * | 9/2004 | Lu et al. ....................... 725/18 |

* cited by examiner

Primary Examiner—Trang U. Tran
(74) Attorney, Agent, or Firm—Schiff Hardin LLP

(57) ABSTRACT

A tuner of a digital television signal translator tunes to receive an RF digital television signal on a first selected television channel. A demodulator provides a baseband digital television signal from the RF digital television signal to which the tuner is tuned. The baseband television signal includes a data component identifying the first selected channel. A data replacer replaces the data component identifying the first selected channel with a data component identifying a second selected channel different from the first selected channel. The output of a modulator is modulated by the baseband television signal including the data component identifying the second selected channel for transmission as a digital television signal on the second selected channel.

33 Claims, 1 Drawing Sheet

DIGITAL TELEVISION SIGNAL TRANSLATOR

RELATED APPLICATION

This application is a continuation of U.S. application Ser. No. 09/827,447 filed on Apr. 6, 2001 now U.S. Pat. No. 6,919,930.

TECHNICAL FIELD OF THE INVENTION

The present invention relates to a translator that translates a digital television signal from one channel to another.

BACKGROUND OF THE INVENTION

The United States has adopted a digital television standard for the transmission of digital television signals. This standard specifies that data is to be transmitted in the form of packets to digital television receivers. For example, video data are transmitted in video packets, audio data are transmitted in audio packets, and certain data including, inter alia, the physical, virtual, and NTSC channels of the corresponding digital television signal are transmitted in packets containing program system information protocol data tables (PSIP data tables). There are several types of PSIP tables, each containing specific information as set forth in ATSC document A/65. The table relevant to this invention is referred to as the virtual channel table (VCT) which normally occupies between one and three packets.

The physical channel corresponds to the carrier frequency that is being used to transmit the digital television signal. The virtual channel is typically, although not necessarily, the channel number over which the corresponding analog television signal is received in the receiving area covered by the digital television signal. For example, the source of a particular digital television signal may be associated with analog channel number 7 in that source's coverage area but may actually be transmitting on a carrier corresponding to channel 30. In this example, channel 7 is the virtual channel and channel 30 is the physical channel. The virtual channel number is frequently displayed by a television such as when a channel change is effected. The NTSC channel is identified by an analog NTSC carrier and is the analog channel assigned to the corresponding source of the digital television signal.

Digital television signals are typically transmitted over the air, over cable, by way of satellites, etc. In some cases, certain impairments may be present which make good reception at particular receiving locations difficult. For example, a hill may interfere with or block the broadcast of a digital television signal from a transmitter to a receiver so that the digital television signal cannot be adequately received by the receiver.

The present invention is directed to a digital television translator which receives the digital television signal, appropriately processes the digital television signal, and forwards the processed digital television signal on so that the digital television signal may be adequately received by a receiver. For example, the translator may be positioned at the impairment, such as on top of the aforementioned hill, so that the harmful effects of the impairment are avoided.

SUMMARY OF THE INVENTION

In one aspect of the present invention, a digital television signal translator comprises a tuner, a demodulator, a data replacer, and a modulator. The tuner tunes to receive an RF digital television signal on a first selected television channel. The demodulator provides a baseband television signal from the RF digital television signal to which the tuner is tuned. The baseband television signal includes a data component identifying the first selected channel. The data replacer replaces the data component identifying the first selected channel with a data component identifying a second selected channel different from the first selected channel. The modulator modulates the baseband television signal including the data component identifying the second selected channel for transmission as a digital television signal on the second selected channel.

In another aspect of the present invention, a method is provided to replace a data component identifying a first selected channel with a data component identifying a second selected channel. The data component identifying the first selected channel is contained in a PSIP data table received in a digital television signal, and the first selected channel is different from the second selected channel. The method comprises the following: finding the data component identifying the first selected channel in the PSIP data table received in the digital television signal; and, replacing the data component identifying the first selected channel with the data component identifying the second selected channel.

BRIEF DESCRIPTION OF THE DRAWING

These and other features and advantages will become more apparent from a detailed consideration of the invention when taken in conjunction with the drawing in which.

DETAILED DESCRIPTION

Figure 1:
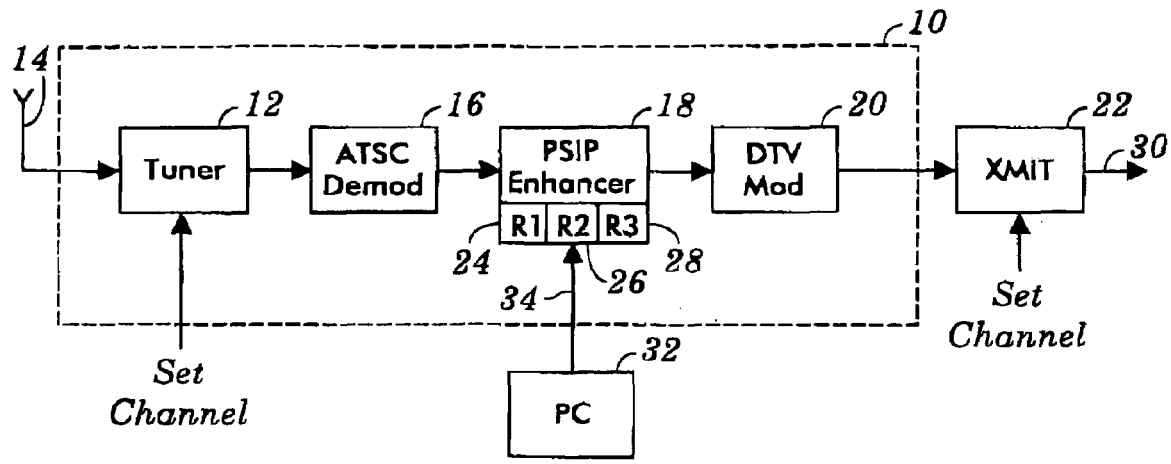
FIG. 1 illustrates a translator having a PSIP enhancer in accordance with one embodiment of the invention; and, FIG. 2 is a flow chart showing the operation of the PSIP enhancer illustrated in FIG. 1.

As shown in FIG. 1, a translator 10 according to one embodiment of the invention includes a tuner 12 that receives and tunes to a digital television signal coupled to the tuner 12 by a receiving device 14 such as an antenna or other input. The tuner 12 is tuned to the carrier frequency corresponding to the channel which is to be translated by the translator 10. This carrier frequency may be referred to herein as the translator input carrier frequency. Tuning of the tuner 12 can be done locally by use of a keyboard or other device coupled to the tuner 12 or can be done remotely by transmitting a channel tuning signal to the tuner 12.

The tuner 12 converts the received digital television signal to an intermediate frequency television signal as is typical and supplies the intermediate frequency television signal to an ATSC demodulator 16 which demodulates the intermediate frequency digital television signal in order to recover the baseband data contained in the digital television signal to which the tuner 12 is tuned. The baseband data contain various packets, including PSIP packets, and are provided to a PSIP enhancer 18 as shown in FIG. 1.

The PSIP enhancer 18 replaces certain data in the PSIP packets with data appropriate to the translator 10 as will be discussed more fully below. The PSIP enhancer 18 then supplies the revised baseband data to a digital television modulator 20 which modulates the translator output carrier frequency with the revised baseband data to form a modulator output signal. The translator output carrier frequency is normally an intermediate frequency signal. The modulator output signal is supplied to a transmitter 22. The transmitter 22, for example, may be a broadcast transmitter, a cable up converter, or other device depending upon the channel through which the translated digital television signal is to be transmitted. The transmitter or up converter 22 up converts the intermediate frequency signal from the modulator 20 for transmission on a television channel selected by the operator. Accordingly, the digital television signal may be received at the receiver device 14 on channel A and is re-transmitted by the transmitter 22 over channel B, where A≠B.

The channel translation from the translator input carrier frequency to the output carrier frequency of the transmitter 22 is generally desirable in order to avoid interference between the digital television signal received at the receiving device 14 and the digital television signal transmitted by the transmitter 22.

The PSIP enhancer 18 includes one or more registers 24, 26, and 28 to hold the new information that is to replace the corresponding received information. This replacement is necessary because the information which is contained in the received digital television signal and which is to be replaced no longer applies to the digital television signal transmitted by the transmitter 22 due to the change in carrier frequency effected by the translator 10.

Accordingly, the register 24 holds the new physical channel to which the translator 10 translates the received digital television signal. The received digital television signal, on the other hand, contains the old physical channel as indicated in the physical channel portion of the received PSIP packets. Thus, the PSIP enhancer 18 replaces the old physical channel in the physical channel portion of the received PSIP packets with the new physical channel held in the register 24. The old physical channel to be replaced by the translator 10 as described herein may be designated A, and the new or replacement physical channel may be designated C.

The register 26 holds the new virtual channel number. As discussed above, while the virtual channel number can be set to any value desired, it is typically set to the channel number over which the corresponding analog television signal is customarily received in the receiving area covered by the digital television signal.

To the extent that it is desired to alter the virtual channel number corresponding to the received digital television signal, the PSIP enhancer 18 replaces the old virtual channel number in the virtual channel portion of the received PSIP packets with the new virtual channel number held in the register 26. The virtual channel number might be changed, for example, if a local source wants receivers to display its identification instead of the identification of an upstream source from which the local source has obtained the digital television signal for re-transmission. If there is no desire to change the virtual channel number, the register 26 is merely set to hold the old virtual channel number. The old virtual channel number to be replaced by the translator 10 may be designated XX, and the new or replacement virtual channel number may be designated YY.

The register 28 holds the new NTSC channel. As discussed above, the NTSC channel is identified by the corresponding analog NTSC carrier and is the analog channel assigned to the corresponding source of the digital television signal received by the translator 10. To the extent that it is desired to alter the NTSC channel corresponding to the received digital television signal, the PSIP enhancer 18 replaces the old NTSC channel in the NTSC channel portion of the received PSIP packets with the new NTSC channel held in the register 28. Changing the NTSC channel also may be optional. If so, and if there is no desire to change the NTSC channel, the register 28 is merely set to hold the old NTSC channel. The old NTSC channel to be replaced by the translator 10 may be designated B, and the new or replacement NTSC channel may be designated herein as D.

The data in the PSIP packets to be replaced by the data held in the registers 24, 26, and 28 is referred to herein as the virtual channel table. Accordingly, the virtual channel table contains the data XX, A and B and is present in the PSIP packets of the received digital television signal.

As shown in FIG. 1, the registers 24, 26, and 28 may be set by a computer 32 such a personal computer which is coupled to the PSIP enhancer 18 by way of an RS232 connection 34. However, other devices could be used to locally set the registers 24, 26, and 28, and/or the registers 24, 26, and 28 may be set remotely as in the case of the tuner 12. Moreover, the function performed by the computer 32 could instead be performed by a microprocessor or other device built into the PSIP enhancer 18.

Figure 2:
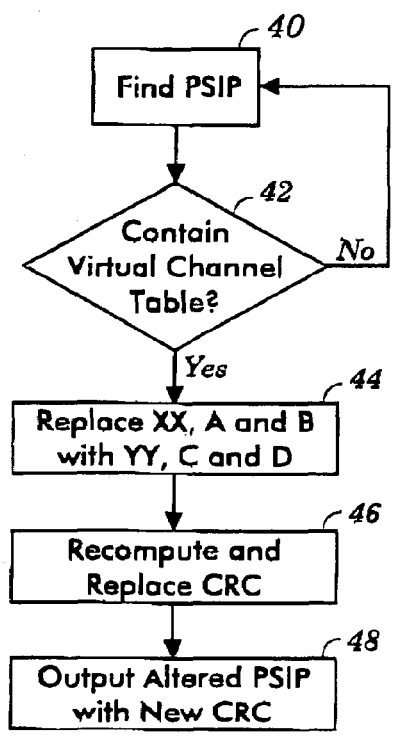

The PSIP enhancer 18 may be a state machine which is implemented as a programmable logic device, but could instead be implemented as an ASIC (Application Specific Integrated Circuit), a programmable logic array, computer, etc. The PSIP enhancer 18 may be programmed in accordance with the flow chart of FIG. 2. As shown in FIG. 2, when the PSIP enhancer 18 finds a PSIP packet in the baseband data supplied to it as indicated by a block 40, the PSIP enhancer 18 determines at a block 42 whether the PSIP packet contains the virtual channel table as described above.

If the PSIP enhancer 18 determines at the block 42 that the PSIP packet in the baseband data does not contain the virtual channel table, flow returns to the block 40. On the other hand, if the PSIP enhancer 18 determines at the block 42 that the PSIP packet in the baseband data contains the virtual channel table, the PSIP enhancer 18 at a block 44 replaces the data in the virtual channel table contained in the PSIP packet of the baseband data with the corresponding data held in the registers 24, 26, and 28.

Thus, the new virtual channel number YY replaces the old virtual channel number XX, the new physical channel C replaces the old physical channel A, and the new NTSC channel D replaces the old NTSC channel B.

The PSIP data table also contains a cyclic redundancy code (CRC) which was originally computed based upon the data originally contained in the PSIP data table. Because this data is changed by the PSIP enhancer 18 due to the replacement of the virtual channel, the physical channel, and/or the NTSC channel, a new cyclic redundancy code must be computed. Accordingly, the PSIP enhancer 18 at a block 46 re-computes the cyclic redundancy code based upon the revised PSIP packet. Also, the PSIP enhancer 18 at the block 46 replaces the old cyclic redundancy code in the PSIP packet with the newly computed cyclic redundancy code.

The PSIP enhancer 18 then supplies the revised PSIP packets to the digital television modulator 20 at a block 48.

While the operations performed by the blocks 44 and 46 are shown in FIG. 2 sequentially, in the embodiment of the invention described herein, the operations of the blocks 44 and 46 are performed in parallel. Thus, the computation and replacement operations of the blocks 44 and 46 are performed continuously.

Because the processing performed by the translator 10 involves demodulating the received digital television signal down to baseband and then re-modulating the received digital television signal for re-transmission on a different channel, the translator eliminates or at least substantially reduces interference between the received and the re-transmitted signal. Moreover, the digital television receivers that receive the translated digital television signal are able to determine the new physical carrier frequency, the new virtual channel number, and the new NTSC channel frequency from the revised virtual channel table contained in the digital television signal that they receive. Thus, the sources of the digital television signals are able to retain their channel identification and branding, and the channel translation is transparent to the viewer.

Certain modifications of the present invention have been discussed above. Other modifications will occur to those practicing in the art of the present invention. For example, the present invention may be used in connection with different modulation techniques such as VSB, QPSK, etc.

Additionally, the techniques used in this invention can be used as described above to replace other received data such as the data in the short name field (usually used to identify the call letters of the broadcaster) with new data.

Also, as described above, the PSIP enhancer 18 includes one or more registers 24, 26, and 28 to hold the new information that is to replace the corresponding received information. However, the new information that is to replace the corresponding received information may be stored in other devices within or without the PSIP enhancer 18 such as in or on a RAM, a ROM, a disc, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

The invention claimed is:

1. A digital broadcast signal translator comprising:
   a tuner tuned to receive an RF digital broadcast signal on a first selected channel;
   a demodulator arranged to provide a baseband signal from the RF digital broadcast signal;
   a data replacer arranged to modify the baseband signal by replacing a first NTSC channel data component in the baseband signal with a second NTSC channel data component different from the first NTSC channel data component, wherein the second NTSC data component is not contained in the received RF digital broadcast signal; and
   a modulator arranged to modulate the baseband signal including the second NTSC data component for transmission as a digital broadcast signal on a second selected channel different from the first selected channel, wherein the second NTSC channel data component specifies an analog NTSC channel which is newly assigned to a corresponding source of the digital broadcast signal.

2. The digital broadcast signal translator of claim 1, wherein the data replacer is further arranged to re-compute a cyclic redundancy code (CRC) based upon the second NTSC data component, and to replace a CRC data component in the baseband signal with the re-computed CRC.

3. The digital broadcast signal translator of claim 1, wherein the data replacer is further arranged to modify the baseband signal by replacing a data component in the baseband signal identifying the first selected channel with a data component identifying the second selected channel, and wherein the data component identifying the second selected channel is not contained in the received RF digital broadcast signal.

4. The digital broadcast signal translator of claim 3, wherein the data replacer is further arranged to re-compute a cyclic redundancy code (CRC) based upon the second NTSC channel data component and the data component identifying the second selected channel, and to replace a CRC data component in the baseband signal with the re-computed CRC.

5. The digital broadcast signal translator of claim 1, wherein the data replacer is further arranged to modify the baseband signal by replacing a first virtual channel data component in the baseband signal with a second virtual channel data component different from the first virtual channel data component, wherein the second virtual channel data component is not contained in the received RF digital broadcast signal.

6. The digital broadcast signal translator of claim 5, wherein the data replacer is further arranged to re-compute a cyclic redundancy code (CRC) based upon the second NTSC channel data component and the second virtual channel data component, and to replace a CRC data component in the baseband signal with the re-computed CRC.

7. The digital broadcast signal translator of claim 5, wherein the data replacer is further arranged to modify the baseband signal by replacing a data component in the baseband signal identifying the first selected channel with a data component identifying the second selected channel, and wherein the data component identifying the second selected channel is not contained in the received RF digital broadcast signal.

8. The digital broadcast signal translator of claim 7, wherein the data replacer is further arranged to re-compute a cyclic redundancy code (CRC) based upon the second NTSC channel data component, the second virtual channel data component, and the data component identifying the second selected channel, and to replace a CRC data component in the baseband signal with the re-computed CRC.

9. The digital broadcast signal translator of claim 1, wherein the first selected channel comprises a first physical channel, and wherein the second selected channel comprises a second physical channel.

10. A method translating a digital broadcast signal, the method comprising:
    receiving an RF digital broadcast signal on a first selected channel;
    generating a baseband signal by demodulating the RF digital broadcast signal;
    modifying the baseband signal by replacing a first NTSC channel data component in the baseband signal with a second NTSC channel data component different from the first NTSC data component, wherein the second NTSC data component is not contained in the received RF digital broadcast signal; and
    modulating the baseband signal including the second NTSC data component for transmission as a digital broadcast signal on a second selected channel different from the first selected channel, wherein the second NTSC data component specifies an analog NTSC channel which is newly assigned to a corresponding source of the digital broadcast signal.

11. The method of claim 10, further comprising:
    re-computing a cyclic redundancy code (CRC) based upon the second NTSC data component; and
    replacing a CRC data component in the baseband signal with the re-computed CRC.

12. The method of claim 10, further comprising modifying the baseband signal by replacing a data component in the baseband signal identifying the first selected channel with a data component identifying the second selected channel, wherein the data component identifying the second selected channel is not contained in the received RF digital broadcast signal.

13. The method of claim 12, further comprising:
re-computing a cyclic redundancy code (CRC) based upon the second NTSC channel data component and the data component identifying the second selected channel; and
replacing a CRC data component in the baseband signal with the re-computed CRC.

14. The method of claim 10, further comprising modifying the baseband signal by replacing a first virtual channel data component in the baseband signal with a second virtual channel data component different from the first virtual channel data component, wherein the second virtual channel data component is not contained in the received RF digital broadcast signal.

15. The method of claim 14, further comprising:
re-computing a cyclic redundancy code (CRC) based upon the second NTSC channel data component and the second virtual channel data component; and
replacing a CRC data component in the baseband signal with the re-computed CRC.

16. The method of claim 14, further comprising modifying the baseband signal by replacing a data component in the baseband signal identifying the first selected channel with a data component identifying the second selected channel, wherein the data component identifying the second selected channel is not contained in the received RF digital broadcast signal.

17. The method of claim 16, further comprising:
re-computing a cyclic redundancy code (CRC) based upon the second NTSC channel data component, the second virtual channel data component, and the data component identifying the second selected channel; and
replacing a CRC data component in the baseband signal with the re-computed CRC.

18. The method of claim 10, wherein the first selected channel comprises a first physical channel, and wherein the second selected channel comprises a second physical channel.

19. A digital broadcast signal translator comprising:
a tuner tuned to receive an RF digital broadcast signal on a first selected channel;
a demodulator arranged to provide a baseband signal by modulating the RF digital broadcast signal, the baseband signal including a virtual channel table (VCT);
a program and system information protocol (PSIP) enhancer arranged to modify channel information included in the VCT, wherein the modified channel information is not contained in the received RF digital broadcast signal; and
a modulator arranged to modulate the baseband signal including the modified channel information for transmission as a digital broadcast signal on a second selected channel different from the first selected channel, wherein the modified channel information comprises a first data component identifying a replacement NTSC channel which is newly assigned to a corresponding source of the digital broadcast signal.

20. The digital broadcast signal translator of claim 19, wherein the modified channel information further comprises a second data component identifying the second selected channel.

21. The digital broadcast signal translator of claim 19, wherein the modified channel information further comprises a second data component identifying a replacement virtual channel number.

22. The digital broadcast signal translator of claim 19, wherein the modified channel information further comprises a second data component identifying a replacement virtual channel number and a third data component identifying the second selected channel.

23. The digital broadcast signal translator of claim 19, wherein the PSIP enhancer is further arranged to re-compute a cyclic redundancy code (CRC) based upon the modified channel information, and to replace a CRC data component in the baseband signal with the re-computed CRC.

24. The digital broadcast signal translator of claim 19, wherein the first selected channel comprises a first physical channel, and wherein the second selected channel comprises a second physical channel.

25. A method of translating a digital broadcast signal, the method comprising:
receiving an RF digital broadcast signal on a first selected channel;
generating a baseband signal by demodulating the RF digital broadcast signal, the baseband signal including a virtual channel table (VCT);
modifying channel information included in the VCT, wherein the modified channel information is not contained in the received RF digital broadcast signal; and
modulating the baseband signal including the modified channel information for transmission as a digital broadcast signal on a second selected channel different from the first selected channel, wherein the modified channel information comprises a first data component identifying a replacement NTSC channel which is newly assigned to a corresponding source of the digital broadcast signal.

26. The method of claim 25, wherein the modified channel information further comprises a second data component identifying the second selected channel.

27. The method of claim 25, wherein the modified channel information further comprises a second data component identifying a replacement virtual channel number.

28. The method of claim 25, wherein the modified channel information further comprises a second data component identifying a replacement virtual channel number and a third data component identifying a the second selected channel.

29. The method of claim 25, further comprising:
re-computing a cyclic redundancy code (CRC) based upon the modified channel information; and
replacing a CRC data component in the baseband signal with the re-computed CRC.

30. The method of claim 25, wherein the first selected channel comprises a first physical channel, and wherein the second selected channel comprises a second physical channel.

31. An enhanced digital broadcast signal for use in a broadcast receiver for receiving audio and video (AV) data from a broadcast transmitter via a digital signal translator, the enhanced digital broadcast signal comprising:
a first data component identifying a channel to which the digital signal translator translates the enhanced digital broadcast signal;

a second data component identifying a virtual channel number which is replaced by the digital signal translator;

a third data component identifying an NTSC channel which is replaced by the digital signal translator and is newly assigned to a corresponding source of the enhanced digital broadcast signal; and a replacement cyclic redundancy code which is recomputed by the digital signal translator based upon the first, second, and third data components.

32. The enhanced digital broadcast signal of claim 31, wherein the first, second, and third data components are included in at least one program and system information protocol (PSIP) data table.

33. The enhanced digital broadcast signal of claim 31, wherein at least one of the first, second, and third data components is included in a virtual channel table (VCT).

* * * * *